United States Patent
Hosseinifar et al.

(10) Patent No.: US 11,292,011 B2
(45) Date of Patent: Apr. 5, 2022

(54) APPARATUS AND METHOD FOR PURIFICATION OF AIR

(71) Applicants: Abdurahman Hosseinifar, Isfahan (IR); Maryam Fakhraei-farouji, Isfahan (IR); Ramin Zibaseresht, Isfahan (IR)

(72) Inventors: Abdurahman Hosseinifar, Isfahan (IR); Maryam Fakhraei-farouji, Isfahan (IR); Ramin Zibaseresht, Isfahan (IR)

( * ) Notice: Subject to any disclaimer, the term of this patent is extended or adjusted under 35 U.S.C. 154(b) by 421 days.

(21) Appl. No.: 16/423,128

(22) Filed: May 27, 2019

(65) Prior Publication Data

US 2019/0358646 A1  Nov. 28, 2019

(51) Int. Cl.

| | |
|---|---|
| *B03C 3/014* | (2006.01) |
| *B03C 3/017* | (2006.01) |
| *B03C 3/16* | (2006.01) |
| *B03C 3/49* | (2006.01) |
| *B03C 3/38* | (2006.01) |
| *B03C 3/68* | (2006.01) |
| *B03C 3/64* | (2006.01) |
| *B01D 47/06* | (2006.01) |
| *B01D 53/18* | (2006.01) |
| *B01D 53/30* | (2006.01) |

(52) U.S. Cl.
CPC ............. *B03C 3/014* (2013.01); *B01D 47/06* (2013.01); *B01D 53/18* (2013.01); *B01D 53/30* (2013.01); *B03C 3/017* (2013.01); *B03C 3/16* (2013.01); *B03C 3/38* (2013.01); *B03C 3/49* (2013.01); *B03C 3/64* (2013.01); *B03C 3/68* (2013.01); *B01D 2252/103* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,222,748 A | * | 9/1980 | Argo ......................... | B03C 3/16 |
| | | | | 95/64 |
| 5,595,587 A | * | 1/1997 | Steed ...................... | B08B 15/00 |
| | | | | 96/27 |
| 6,656,253 B2 | * | 12/2003 | Willey ...................... | B03C 3/16 |
| | | | | 96/27 |

(Continued)

*Primary Examiner* — Christopher P Jones
*Assistant Examiner* — Sonji Turner

(57) ABSTRACT

An apparatus and method for purification of air, is disclosed. The apparatus includes: (a) a mist generator, is configured to generate water micro droplets, (b) a charging chamber, is configured to transfer electric charges to the micro droplets, (c) an interacting space is configured to act as a physical barrier and provide sufficient space for adsorption of air pollutants, (d) a collecting chamber is configured to collect the contaminated micro droplets and convert them to a liquid form, (e) and a water recycling section, is configured to remove the contaminations and provide a usable clean water for the mist generator. The collecting chamber of the apparatus is incorporated with a plastic grid enhanced with surface modified nanofibers to promote the micro droplet collecting efficiency. Further, a method of fabricating a plastic grid enhanced with surface modified nanofibers for an air purifier apparatus is also disclosed.

8 Claims, 9 Drawing Sheets

(56) References Cited

U.S. PATENT DOCUMENTS

| | | | |
|---|---|---|---|
| 7,465,338 B2* | 12/2008 | Kurasek | B03C 3/09 |
| | | | 95/75 |
| 7,503,512 B2* | 3/2009 | Nakada | F24F 6/12 |
| | | | 239/690.1 |
| 7,717,980 B2* | 5/2010 | Tepper | B03C 3/16 |
| | | | 95/71 |
| 8,241,407 B2* | 8/2012 | Yano | B60H 3/0071 |
| | | | 96/19 |
| 10,960,406 B2* | 3/2021 | Zhang | B01D 50/006 |
| 2011/0067571 A1* | 3/2011 | Asano | B01D 46/0067 |
| | | | 96/27 |

* cited by examiner

900

902 — Generate Water Micro Droplets From A Supply Of Water By Means Of Ultrasonic Waves 904 — Generate Charged Micro Droplets Of Water And Forward Them To The Outside Of Apparatus Via Charge Transfer Applied Over Water Micro Droplets Inside A Charging Chamber 906 — Enable Interaction Of The Charged Micro Droplets Of Water With Air Pollutants Outside The Apparatus 908 — Re-enter Of Mixture Of Interacted Charged Micro Droplets And Polluted Air Inside A Collecting Chamber Of The Apparatus To Convert Them Into A Contaminated Liquid Form And Forwarding A Fresh Air Outside The Apparatus 910 — Recycle The Contaminated Water By A Series Of Water Purification Filters And Providing Fresh Water Suitable For The Mist Generator

FIG. 9

APPARATUS AND METHOD FOR PURIFICATION OF AIR

BACKGROUND OF THE INVENTION

Generally, an air purifier is an apparatus used to remove air contaminations or atmosphere pollutants to produce fresh air. Atmosphere pollutants are very diverse and each one has its own physical and chemical characteristics. Accordingly, diverse purification methods are introduced for treating any of them based on their characteristics.

Biological contaminations, for example, such as viruses and microbes, are treated by ultraviolet irradiation while particulate maters are mainly removed by an application of HEPA filters and Volatile organic compounds are widely removed by application of an adsorbent such as activated carbon. On the other hand, synthetic pollutants such as NOx and SOx gases are a major concern in the industrial communities that commonly are treated with photo-catalytic reactions.

Among existing air purification methods such as adsorption methods, filtration method, photo-catalytic method and other methods, nature performs exclusively. Naturally occurring phenomena such as rain or wind are sometimes the sole way of rescuing human societies from the critical conditions of air pollution. Several nature-inspired air purification methods are introduced that are based on the application of water in the air purification. For example, Victorian dust collectors were used decades ago to remove smoke by means of water. More recently, mist cannon is applied in the polluted cities that utilizes fine particles of water for air cleaning.

Current air purifications methods are based on application of atomized or micro droplets of water. The fate of micro droplets of water after interaction with air pollutants is not clear, but there exists different method of collecting water micro droplets after the interaction. For example, condensation via Peltier coolers is a common way of converting moisture or water droplets into liquid form.

Though existing systems and methods exist to facilitate air purification, most of the inventions work based on energy consuming methods that need electricity or other sources of energy to liquidity water micro droplets. Therefore, there is a need for a system to effectively purify the toxic gases and remove particulate matters from the air that do not require high pressure, electricity and any other source of energy. Further, there is a need for a system and method to resolve the problem of air pollution of both indoor and outdoor environment, and that rectifies the deficiencies of conventional air purifiers. Further, there is a need for a system and method to promote purification, but on a more efficient level.

SUMMARY OF THE INVENTION

An air purification apparatus and method for removal of pollutants such as particulate matters, toxic gaseous, volatile organic compound (VOC), biological pollutants and any external material by utilizing charged microdroplets of water, is disclosed. The air purifying apparatus could be used in indoor and outdoor applications.

One aspect of the present disclosure is directed to an air purification apparatus, comprising: (a) a mist generator configured to convert a supply of water to microdroplets by means of ultrasonic waves; (b) a charging chamber in fluid communication with the mist generator comprises a plurality of electrodes, the charging chamber is configured to apply electrical polarity to the microdroplets passing between the electrodes to generate charged microdroplets; (c) a connecting pipe configured to forward generated water droplets from the mist generator toward the charging chamber and lead the droplets at an environment requiring air purification through a plurality of nozzles; (d) a fan configured to pull a mixture of air and charged microdroplets and transfer pollutants from air to the charged microdroplets; (e) a collection chamber having a plurality of plastic grids enhanced with surface modified nanofibers configured to receive the pulled mixture, wherein the plastic grids are configured to convert the polluted microdroplets into a polluted water and separates fresh air from the polluted microdroplets for emission at the atmosphere; and (f) a set of water treatment devices configured to recycle the polluted water to clean water usable in the mist generator.

In one embodiment, the apparatus further comprises a collecting tube in communication with the fan comprising at least a pair of collecting electrodes to assist in collecting the charged microdroplets after interaction with air pollutants by means of electrophoretic forces. In another embodiment, the apparatus, further comprises a reservoir in communication with the mist generator configured to store the supply of water. In one embodiment, the collection chamber comprises a fresh water inlet and an outlet, the fresh water inlet to compensate water loss of system, and the outlet is configured to emit the generated fresh air in the atmosphere. In another embodiment, the apparatus further comprises a water pump in fluid communication with the collection chamber, and a filter assembly in fluid communication with the water pump, the filter assembly is configured to recycle the polluted water by removing particulate matters and toxic gases.

In one embodiment, the apparatus further comprises a power source to provide electrical energy to the apparatus and a microprocessor to control electro-mechanical system of the apparatus. In one embodiment, the apparatus further comprises plurality of sensors including particulate matters (PM) sensor, humidity sensor, temperature sensor, inlet water pressure sensor and water level sensor, the plurality of sensors is configured to measure respective parameters and transfer signals to the micro-processor. In one embodiment, the apparatus further comprises a user interface and a display to manually control and monitor performance of the apparatus. In another embodiment, the mist generator comprises a piezo electric ceramic vibrator and a water level sensor incorporated in a chamber with at least one water inlet and a fan configured to produce and forward the micro droplets toward a connecting pipe. In one embodiment, the charging chamber comprises a high voltage power supply, a series of paired electrodes and a pair of auxiliary electrodes.

In one embodiment, the electrodes are configured as a flat sheet, disk or needle shape. In another embodiment, the fan is a centrifuge fan. In a related embodiment, the fan is a horizontal fan. In one embodiment, the collecting chamber comprises at least one air inlet and one air outlet, plurality of plastic grids enhanced with surface modified nanofibers, and a water outlet. In another embodiment, the plastic grid has a mesh size less than 10×10 mm. In one embodiment, nanofibers are electrospun nanofibers selected from a group comprising solvent born fibers and polyacrylonitrile (PAN). In another embodiment, the nanofibers have a porosity of 30-70%. In one embodiment, the surface modifier is amino silane.

Another aspect of the present disclosure is directed to a method for purifying air using an air purification apparatus, comprising the steps of: (a) converting a supply of water to microdroplets by means of ultrasonic waves; (b) applying electrical polarity to the microdroplets, utilizing a plurality of electrodes, to generate charged microdroplets; (c) enabling interaction of charged micro droplets of water with air pollutants; (d) adsorbing the interacted water droplets on a surface of a plastic grid enhanced with surface modified nanofibers; (e) converting the polluted microdroplets into a polluted water and separates clean air from the polluted microdroplets by passing through a network of fibers; (f) discharging the clean air at the atmosphere; and (g) recycling the polluted water by removing particulate matters and toxic gases by passing through a plurality of water treatment devices. In a related embodiment, the interaction of charged micro droplets of water with the pollutants are physical, electrostatic and chemical interactions.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

FIG. 9 exemplary illustrates a method of air purification using an air purifier apparatus, according to another embodiment of the present invention.

DETAILED DESCRIPTION

Figure 1:
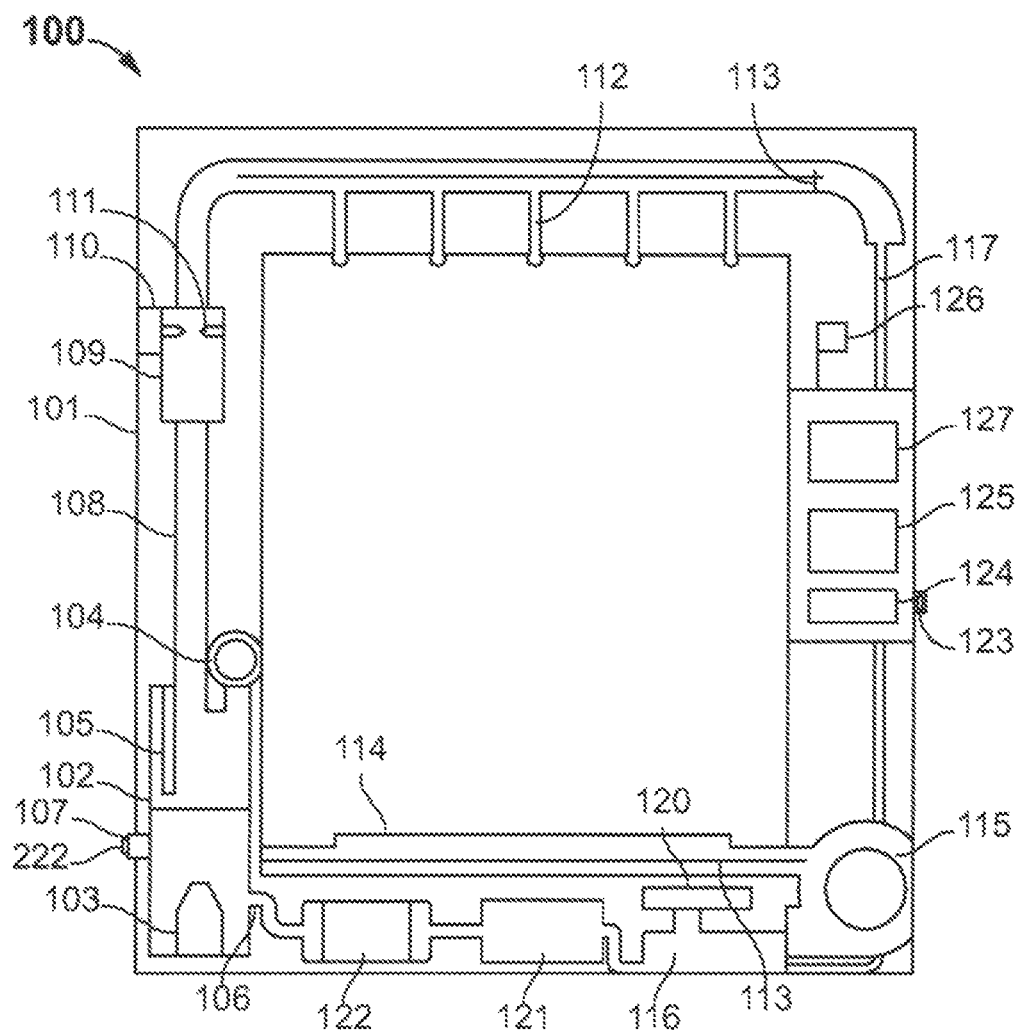
FIG. 1 exemplarily illustrates an air purification apparatus according to an embodiment of the present invention.

The present invention generally relates to an air purification apparatus, and more particularly relates to an apparatus and method for purifying air by utilizing charged microdroplets of water.

A description of embodiments of the present invention will now be given with reference to the figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The present disclosure describes methods, devices, apparatus, and systems for air purification including, but is not limited to, generating micro-droplets of water in a chamber, charging the micro droplets and producing charged micro droplets, Interacting air pollutants with the charged micro droplets outside the apparatus, reentering the droplets and collecting the droplets using a surface modified nanofiber in a collecting chamber, as well as refining the polluted water in a waste water recycling section.

The air purifier apparatus or air purifier of the present invention may comprise five main functional sections. Said functional sections include micro-droplets generating section, a charged micro droplet generating section, a mixing section, a collecting section and a recycling section. The five sections are embedded in a housing having at least one exterior water and power supply inlet, air inlet and outlet. The micro-droplets generating section comprises a mist generating chamber, a fan and a connecting pipe, is configured to convert liquid water to the atomized form (mist) or water micro droplets and forward them toward next sections. The charging section comprises a charging chamber, high voltage power supply and auxiliary electrodes, is configured to generate and transfer electric charges and forces to the micro droplets and producing a reactive agent to interact with air pollutions.

The mixing section comprises a series of nozzles and a hollow sphere in the middle of the housing, is configured to forward the charged micro droplets of water outside the apparatus to combine and interact with a polluted air. The collecting section comprises a fan that is configured to guide a mixture of the charged micro droplets of water and air from outside the apparatus and a collecting chamber with a main component of surface modified nanofibers that is configured to convert the polluted micro droplets to a liquid contaminated water. The final section of the apparatus that is a recycling section comprises plurality of water treatment devices is configured to convert the contaminated water to a freshwater reusable in the first section.

The five functional sections may be embedded into a housing. Thereby the housing is fabricated based on end user application. The housing is made of metallic materials. In one embodiment, the housing is a floor type framework. In another embodiment the housing is a window framework.

The reactive agent to interact with air pollutants may be charged micro droplets of water. In one embodiment, the reactive agents are generated by ultrasound vibration of liquid water and charging them by an applied potential in a charging chamber. In one embodiment, the ultrasound vibration is produces by piezo electric ceramics with a vibration frequency in the range of 1 kilo Hertz to 10 mega Hertz. In one embodiment the applied potential in a range of kilo volts of direct or pulsed current.

The charging chamber may be placed next to the mist generating chamber in a flow trajectory of the water micro droplets. In one embodiment, water micro droplets flow in space of mist generating chamber and charging chamber through a connecting pipe by means of external force. In one embodiment, the external force in produced by a fan. In another embodiment, the charging chamber further comprises a series of paired electrodes. Said electrodes are configured to transfer the electric charges to the water micro droplets. In one embodiment, the charge transfer takes place by direct discharge between the opposite pole electrodes. In another embodiment, the charge transfer take place by collision of the water micro droplets to the surface of charged electrodes. In one embodiment, the paired electrodes are configured in a form of disks. In another embodiment, the electrodes are configured in a form of needles. In another embodiment, the electrodes are configured in a form of flat sheets. In one embodiment, the electrodes are made of non-corrosive and conductive materials. In one embodiment, graphite is used as an electrode. In one embodiment, the apparatus further comprises a pair of auxiliary electrodes placed outside the charging chamber and in the trajectory of connecting and collecting pipes to generate electrophoretic force and promote electric interaction with air pollutants. In some embodiment, auxiliary electrodes are connected to the high voltage power supply of the charging chamber.

The charged micro droplets of water may interact with air pollutants in a space outside the apparatus. In one embodiment, the charged micro droplets enter the space by a plurality of nozzles located at upper portion of the housing. In one embodiment, a cascading appearance of the flowing micro droplets acts as a physical barrier and prevent freely moving of polluted air from rear side of apparatus to the front side. In one embodiment, air pollutants are attracted to the charged micro droplets via Coulomb forces, hydrogen bond forces, and physical absorption on the surface of droplets and forms an interacted for of charged micro droplets. In one embodiment, flow direction, gravity and electrophoretic forces exerted on the charged micro droplets as well as a pulling force of the fan located at the collecting place, provide a directional rout to the polluted air, charged micro droplets and their combinations toward the apparatus air inlet.

In one embodiment, the interacted forms of charged micro droplets as well as non-interacted forms are accumulated in the collecting chamber and produce a contaminated water. In another embodiment, main component for collecting the said droplets is a plastic grid enhanced with surface modified nanofibers. In one embodiment, vast presence of hydrogen bonds on the surface of the main component results in adsorption of the interacted and non-interacted forms. In another embodiment, numerous capillary forces between drop-droplet and droplet-nanofibers results in formation of small aggregates and accumulation of the comminuted water inside the collecting chamber. In one embodiment, the collecting chamber forwards the comminuted water to the recycling section via an outlet placed at the bottom of the chamber. In some embodiments the collecting chamber is equipped with a backwash system to periodically clean the grids.

The contaminated water obtained from the collecting section may be exposed to a filtration process. In one embodiment, filtration process removes particulate maters, toxic gases, microorganism and any other contaminations of the water. In one embodiment, the filtration devices placed next to the collecting chamber, receive the contaminated water and pass it through a series of filters via a water pump driving force. In some embodiment, water treatment devices are commercially available devices used in water purifiers. In some embodiment, the water pump is a diaphragm pump. In one embodiment, the filters are active carbon, sediment fiber filters or a revers osmose membranes.

The method of fabricating the main collecting component for an air purification process is disclosed. The method comprises the steps of: (1) electrospinning of nano fibers by a solvent based precursor on a plastic grid to produce a low fiber density mat on the plastic substrate, (2) Surface functionalization of nanofibers via vapor deposition of a hydrophilic agent, (3) curing the surface modified nano fibers in an incubator to complete the hydrolysis and condensation of hydrophilic agent and to provide the main collecting component. In some embodiments, the predetermined temperature to cure the modified nanofibers is 80° C. In another embodiments, the predetermined relative humidity to cure the nanofibers is 50%.

The nano fibers may be electrospun polyacrylonitrile (PAN) on a polypropylene (PP) grid. In some embodiment a surface modification agent is (3-Aminopropyl) triethoxysilane (APTS). In some embodiment, the electrospun PAN nanofibers are produces by dissolving 12% w of PAN in DMS at 85° C. and stirring for 2 h until completely dissolved. In another embodiments, For the electrospinning, 5 mL solution was loaded into a 10 mL syringe and an electrospinning rate of 0.15-0.35 mL/h was adjusted, an applied voltage (12 kV) and distance (about 12 cm) were also utilized.

Before beginning the electrospinning process PP grid was placed on an aluminum foil and the position of the grid moved periodically during the electrospinning to cover it uniformly. The electrospun grid was placed under ambient conditions for 48 h and then was exposed to a vapor of APTS at 80° C. for 20 min. In some embodiments, the predetermined temperature to cure the silane on nanofibers is 80° C. In another embodiments, the predetermined relative humidity to cure the silane on nanofibers is 50%.

The method of air purification using the air purifier apparatus is disclosed herein, where the method comprises the steps of: (1) generating micro droplets of water by an ultrasound mist generator, (2) transfer of the micro droplets in a charging chamber and generation of charged micro droplets of water, (3) transfer of the charged micro droplets of water in a space outside the apparatus to interact with air pollutants, (4) reentering the mixture of charged micro droplets and air in the apparatus by means of a fan, gravity force and electrophoretic forces to guide them on a plastic grid enhanced with surface modified nano fibers to collect the droplets in a liquid form, (5) transfer the contaminated water obtained from collecting step to a series of water filters to reuse it in the apparatus.

One aspect of the present invention is directed to a floor type air purifier apparatus comprising five functional sections including: a micro droplets generating section with at least one water inlet and one outlet for the generated droplets, incorporated with a piezo electric ceramic, a driving fan, and water level sensor configured to generate water micro droplets and transfer them in a connecting pipe, charging chamber and outside the apparatus; a charging section place next to the micro droplets generating chamber and in the flow trajectory of generated droplets comprises a high voltage power supply, a series of paired electrodes and a pair of auxiliary electrode configured to transfer electric charges to the water micro droplets.

The apparatus may further comprise a mixing section configured to provide sufficient space for mixing charged micro droplets with polluted air; a collecting section configured to reenter the mixture of the mixture of charged micro droplets of water and polluted air in the apparatus and collect the interacted droplets in a liquid form comprises an air inlet, a horizontal fan, a series plastic grids enhanced with surface modified nano fibers, a fresh air outlet, and a contaminated water outlet; a series of water recycling devices place next to the collecting section configured to receive the contaminated water and convert it to clean water reusable in the mist generator comprises a water pump, and at least one of carbon, sediment or revers osmose filters.

The floor type air purifier may comprise a housing at least with one water and power supply inlet, one air inlet and one air outlet. In some embodiments the floor type apparatus comprises a hollow space in the middle of housing configured to provide a sufficient space for combination of emitted charged micro droplets of water and pullulated air.

Another aspect of the present invention is directed to a window type air purifier apparatus comprising five functional sections. The apparatus includes (a) a micro droplets generating section with at least one water inlet and one outlet for the generated droplets, incorporated with a piezo electric ceramic, a driving fan, and water level sensor configured to generate water micro droplets and transfer them into a connecting pipe, charging chamber, and mixing section; (b) a charging section placed next to the micro droplets generating section and in the flow trajectory of generated droplets comprises a high voltage power supply, a series of paired and a pair of auxiliary electrodes configured to transfer electric charges and forces to the water micro droplets; and (c) a mixing section configured to provide sufficient space for mixing charged micro droplets with incoming polluted air.

The apparatus may further include a collecting section configured to reenter the mixture of charged micro droplets of water and polluted air in the apparatus and collect the interacted droplets in a liquid form comprises an air inlet, a centrifuge fan, plurality of plastic grids enhanced with surface modified nano fibers, a fresh air outlet, and a contaminated water outlet; (e) a series of water recycling devices placed next to the collecting section configured to receive the contaminated water and convert it to clean water reusable in the micro droplet generator comprises a water pump, and at least one of carbon, sediment filters or revers osmose membranes.

The window type air purifier may comprise a window shape framework housing with at least one water and power supply inlet, one air inlet and one air outlet. In some embodiments the window type air purifier comprises a hollow space in the middle of housing configured to provide a sufficient space for combination of emitted charged micro droplets of water and pullulated air and embedding possible glasses sheets. In some embodiment the window type air purifier prevents incoming polluted air inside a building by creating a physical barrier of charged micro droplets of water against incoming air.

The apparatus may further comprise a power source and a micro-processor. The power source is integrated to provide electrical energy to the apparatus. The micro-processor is configured to control electro-mechanical system of the apparatus. The apparatus further comprises a plurality of sensors. In one embodiment, the plurality of sensors includes, but not limiting to, particulate matters (PM) sensor, humidity sensor, temperature sensor, inlet water pressure sensor and water level sensor. The plurality of sensors is configured to measure respective parameters and transfer signals to the micro-processor. The apparatus further comprises a user interface and a display to manually control and monitor performance of the apparatus. The apparatus further comprises a set of keys to manually control the function of the apparatus.

FIG. 1 is a schematic illustration of an example of an air purification apparatus 100 equipped with an air purification system arranged in accordance with the present disclosure. Referring to FIG. 1, the air purification apparatus 100 may include a housing 101 substantially defining the exterior thereof. The housing 101 may be designed, but is not limited to, as a floor type or a window framework. The floor type housing 101 may be made of, but is not limited to, a plastic material, such as polyethylene, polycarbonate, or acrylonitrile butadiene styrene (ABS) and the window framework may be made of, but is not limited to, polyvinyl chloride or aluminum. The air purification apparatus 100 may include, but is not limited to, one or more water micro droplets generating chamber 102 located at, for example, a lower portion of the housing 101. Said chamber may include, but is not limited to, one or more ultrasound mist generator 103 to convert electronic signals to ultrasound vibrations that transfer to liquid water inside the chamber 102 and convert it to the micronized water (mist) (not shown). The chamber 102 may also include, but is not limited to, one or more fan 104 to drive the generated droplets inside a connecting pipe 108. The chamber 102 may also include, but is not limited to, one or more water supply inlet equipped with solenoid valve 107. Water may be flow inside the chamber 102 originating from a recycled clean water inlet 106 or a fresh water supply inlet 107. Generated mist then transfers at least to one polarization assembly. The polarization assembly comprises a polarization chamber or charging chamber 109 configured to produce charged micro-droplets of water. The charging chamber 109 comprises a high voltage power supply circuit 110 to generate a high voltage current and transfer it at least to one pair of electrodes 111 to charge flowing micro-droplets of water inside the chamber 109. Charging process may include, but is not limited to, pulsed discharging, continuous applying of current without discharging or a combination of thereof.

The electrodes 111 may be selected from, but is not limited, a group of graphite, stainless steel, noble metals, conductive polymers or a combination of thereof. The electrodes 111 may also constructed, but are not limited to, as parallel sheets, disks or needle shape electrodes. An auxiliary pair of electrodes 113 connected to the high voltage power supply 110 also may be placed, but is not limited to, inside the end of connecting pipe 108 as well as inside the air inlet 114 to produce a uniform electrophoretic force. The air purification apparatus 100 may include, one or more nozzles 112 located at, for example, one upper side portion of the housing 101 along the trajectory of connecting pipes 108 to emit the charged micro droplets of water into a space outside the apparatus. The air purification apparatus 100 may include, one or more exterior air inlet 114 located at, for example, lower side portion of the housing 101 that may include barriers such as grilles.

A stream of mixture of charged micro-droplets of water and polluted air including particulate maters, microorganisms as well as toxic gases are guided to a collecting chamber 116 by a pulling force of at least one fan 115, gravity force, and the electrophoretic force. The fan 115 may be, but is not limited to, one of centrifuge or horizontal fans. The mixture is then combined in the collecting chamber 116. The droplets collide with a plurality of surface modified nano fibers 119 located on a plastic grid 118 (not shown), attract to the nanofibers in an energy free manner and convert to a contaminated liquid on the surface of grid 118. An example of the configuration of the plastic grid 118 and surface modified nano fibers 119 will be discussed with reference to FIG. 2. Continuous stream of incoming mixture inside the collecting chamber 116 results in accumulation of water on the bottom of chamber 116 in a form of the contaminated water.

Fresh air flows out of the apparatus from one or more exterior air outlets 120 located at, for example, on front or side portion of the housing 101. A connecting tube 117 is used to forward the accumulated water at the end of connecting pipes 108 to the collecting chamber 116 to inhibit condensed water flooding from the nozzles 112. The air purification apparatus 100 may also include, but is not limited to, one or more waste water treatment devices to recycle and reuse the contaminated water in the apparatus 100. The water treatment devices comprise at least a water pump 121 to redirect contaminated water from the collecting chamber 116 to at least one filter device 122. The filter 122 and water pump 121 may be selected from, but are not limited to, a group of commercially available filters and pumps such as sediment, carbon, zeolite filters or reverse osmose membranes.

The air purification apparatus 100 also includes electronic circuitry 125 disposed in the housing 101, one or more control switches 124 including a power switch disposed to be operated by a user. The air purification apparatus 100 also includes, but is not limited to, A display device 127 to show the apparatus performance, one or more sensor 126 to measure air quality parameters such as particulate maters, NOx and SOx gases, and temperature and relative humidity of atmosphere. The electronic circuitry 125 controls various electrically-driven devices installed in the air purification apparatus 100. The control method includes, but is not limited to, obtaining signals from the sensors 126 as well as water level sensor 105 and sending appropriate signals to the fans 104 and 115, ultrasound mist generator 103, high voltage power supply 110, water pump 121 and possible solenoid valve 107, either manually or in a programmed way.

Figure 2:
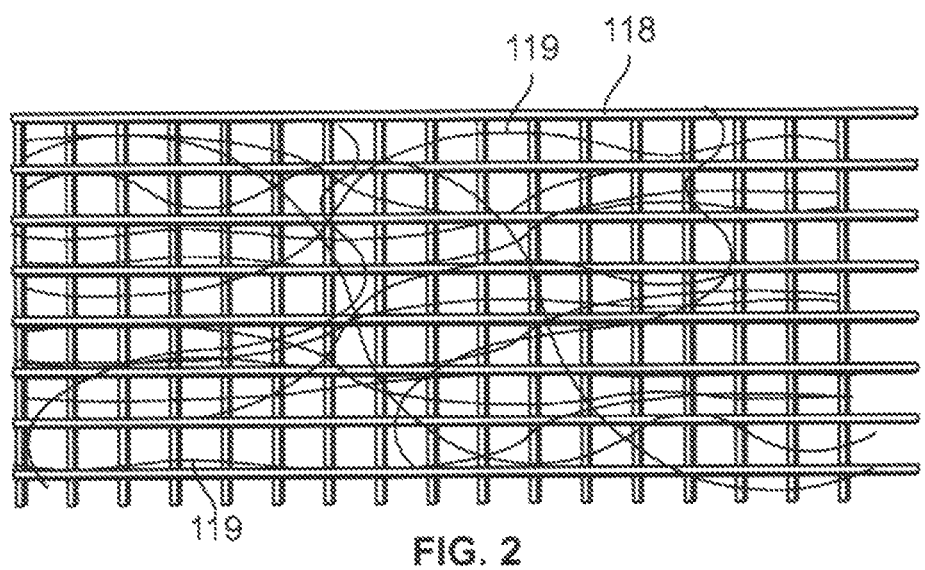
FIG. 2 exemplarily illustrates plastic grid enhanced with surface modified nanofibers according to an embodiment of the present invention.

FIG. 2 is a schematic illustration of an example of a main component for collecting charged micro droplets of water in combination with air pollutants including a plastic grid 118 enhanced with surface modified nano fibers 119 in accordance with the present disclosure. Nano fibers are produced by electrospinning a solvent born precursors on plastic grid 118 as a substrate. The precursors may be dissolved in wide range of concentration. A preferred concentration of polyacrylonitrile ins DMS is about, but is not limited to, 12% w. The grid 118 then may be, but is not limited to, exposed to a vapor of hydrophilic agent and a layer of water attracting functionalities are produces either on the surface of nanofibers or grid structure after hydrolysis and condensation in an incubator. In one embodiment, amine functionalities on the surface of nanofiber are produced by application of an amino silane.

The method of functionalization includes, but is not limited to, physical or chemical vapor deposition of functionalization agent. wide range of silane may be used for the functionalization process. (3-Aminopropyl) triethoxysilane (APTS) may be, but is not limited to, a good functionalization agent because of proper vapor pressure below the thermal decomposition range of PAN nano fibers. This means that nano fiber may be functionalized completely with APTS vapors without suffering from decomposition.

Intense hydrogen bond attraction between charged micro droplets of water and surface functionalities of nano fibers are an attracting force for adsorption and accumulation of the water droplets on a surface of nanofibers. Hydrogen bonds may be formed between amine functionalities of nanofibers and hydrogen of water micro droplets. Another hydrogen bond formation may be formed between the multiple water droplets. Strong capillary forces after adsorption of water droplets on nanofibers including droplet-fiber and droplet-droplet capillary forces are a driving force for water movement on the fibers and accumulation of contaminated water.

Electrospun nano fibers 119 are non-wovenly arranged on plastic grid 118 therefor the arrangement allow it to provide wide range of pore size inside a produced mat. A preferred pore size in the produced mat may be about 5 times more than a singular water micro droplet and it may be in the range of 100 microns. The fabricated gird may be placed diagonally in the collecting chamber to guide water droplets downward the chamber and prevent water saturation over the fibers during the purification. Placement angle of the plastic grid 118 enhanced with nano fiber 119 may be generally any angle between 0 and 90°.

Figure 3:
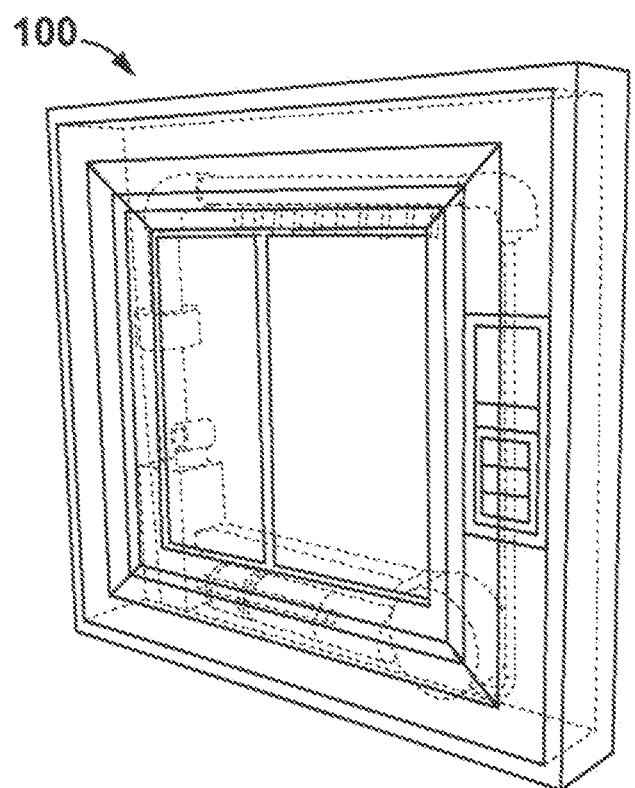
FIG. 3 exemplarily illustrates the air purification apparatus installed on a window according to an embodiment of the present invention.
Figure 4:
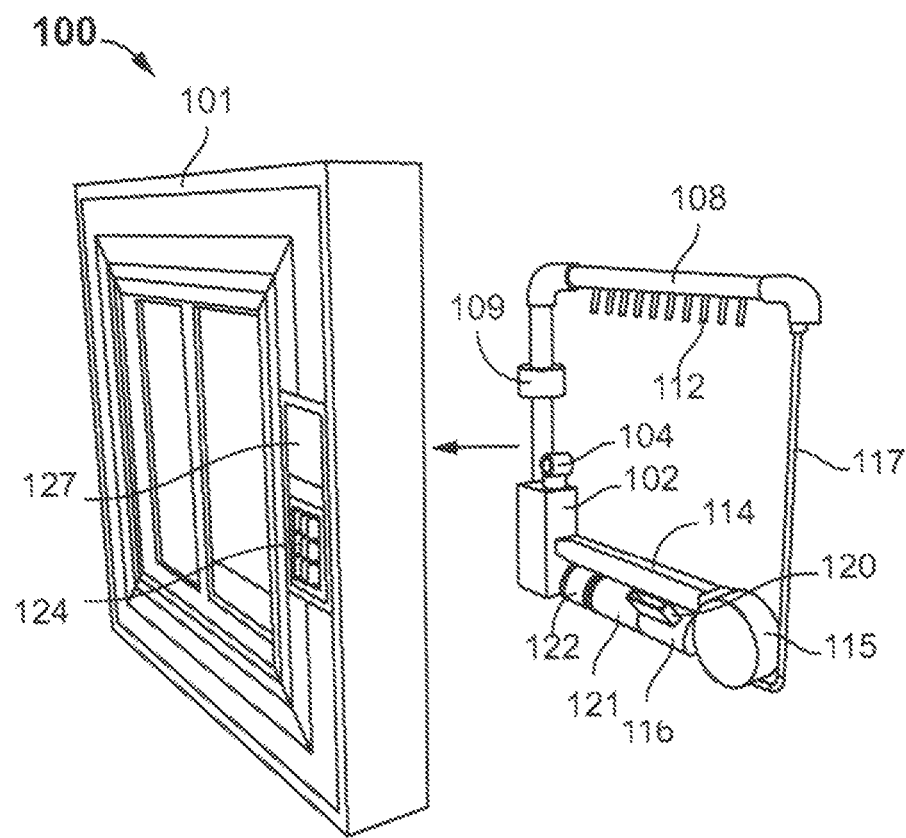
FIG. 4 exemplarily illustrates an exploded view of the air purifier apparatus installed on a window, according to an embodiment of the present invention.

FIG. 3 exemplarily illustrates the air purification apparatus 100 installed on a window according to an embodiment of the present invention. FIG. 4 exemplarily illustrates an exploded view of a window type air purifier apparatus 100, according to an embodiment of the present invention. The window type air purifier comprises a window framework housing 101 with at least one water and power supply inlet (not shown), one air inlet 114 and one air outlet 120. The window type air purifier also comprises a hollow space in the middle of housing configured to provide a sufficient space for combination of emitted charged micro droplets of water from nozzles 112 and pullulated air and embedding possible glasses sheets. The window type air purifier prevents incoming polluted air inside a building by creating a physical barrier of charged micro droplets of water against incoming air.

Figure 5:
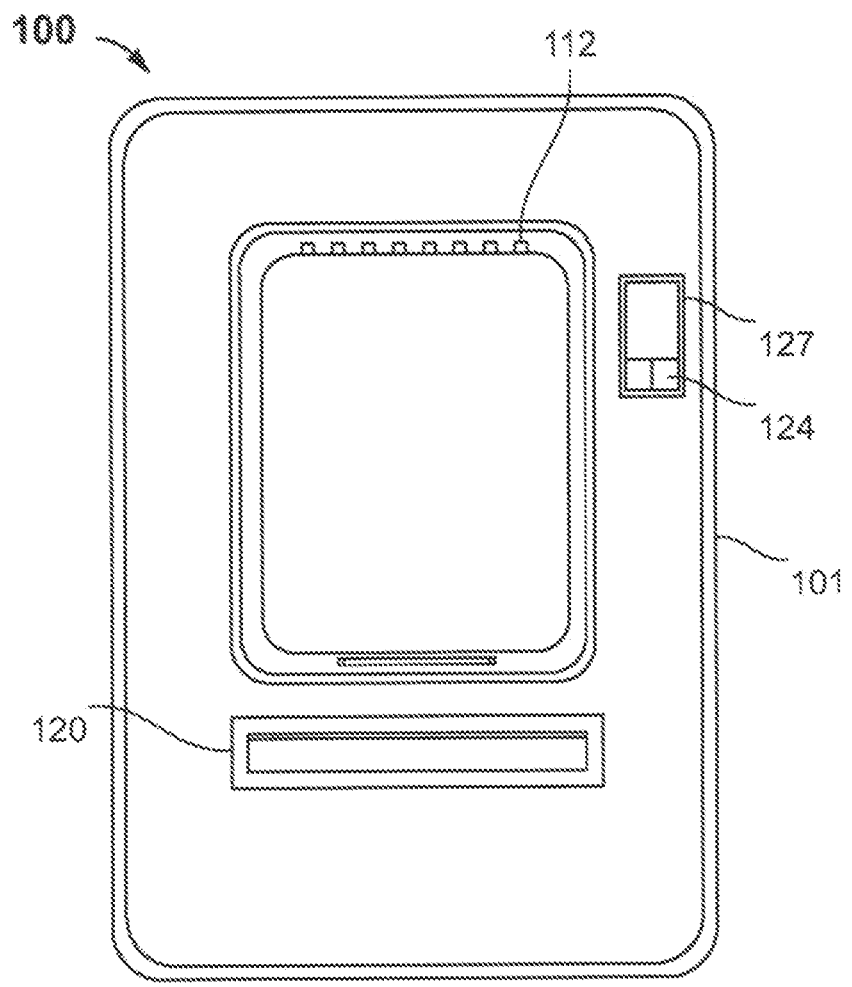
FIG. 5 exemplarily illustrates a front view of a floor type air apparatus, according to an embodiment of the present invention.
Figure 6:
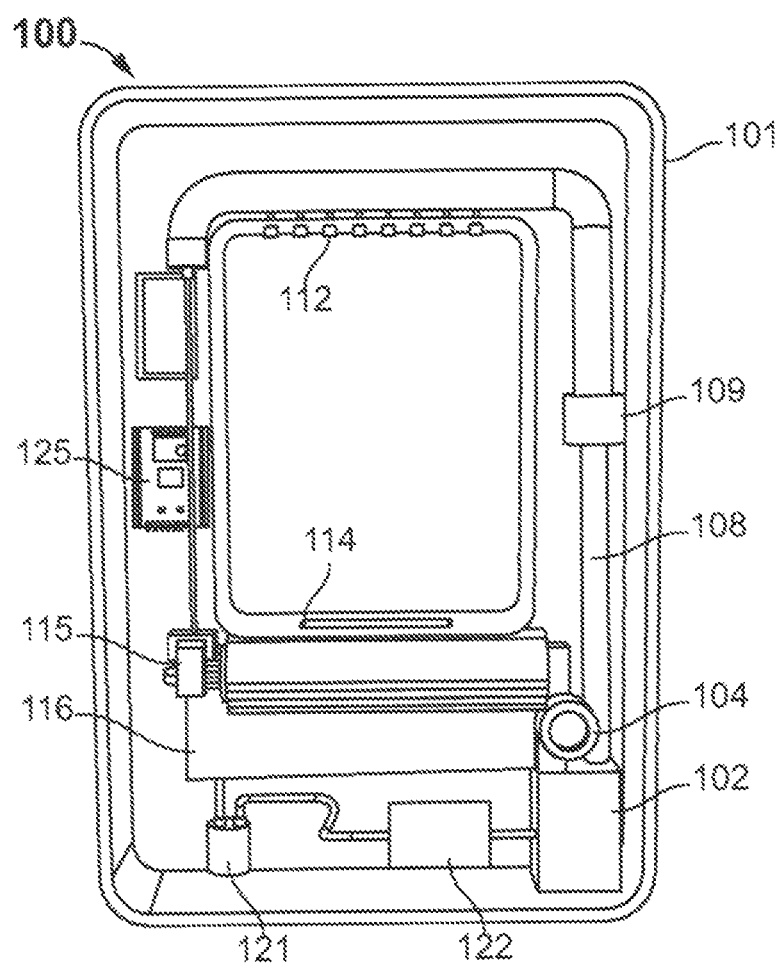
FIG. 6 exemplarily illustrates rear open view of a floor type air apparatus, according to an embodiment of the present invention.

FIG. 5 and FIG. 6 exemplarily illustrates a front and rear view of a floor type air purifier apparatus 100 respectively, according to an embodiment of the present invention. Collecting section of the floor type purifier comprise a horizontal fan 115 that directly transfers a mixture of water micro droplets and polluted air toward the plastic grid 118. During the emission of water micro droplets from the nozzles 112, production of leaking water macro droplet on the tip of nozzles 112 is inevitable. The leaking droplets are a result of condensation at the tip of nozzle 112. The leaking macro droplets fall down irregularly. The air inlet 114 is configured so that redirect the falling droplets inside the collecting chamber 116.

Figure 7:
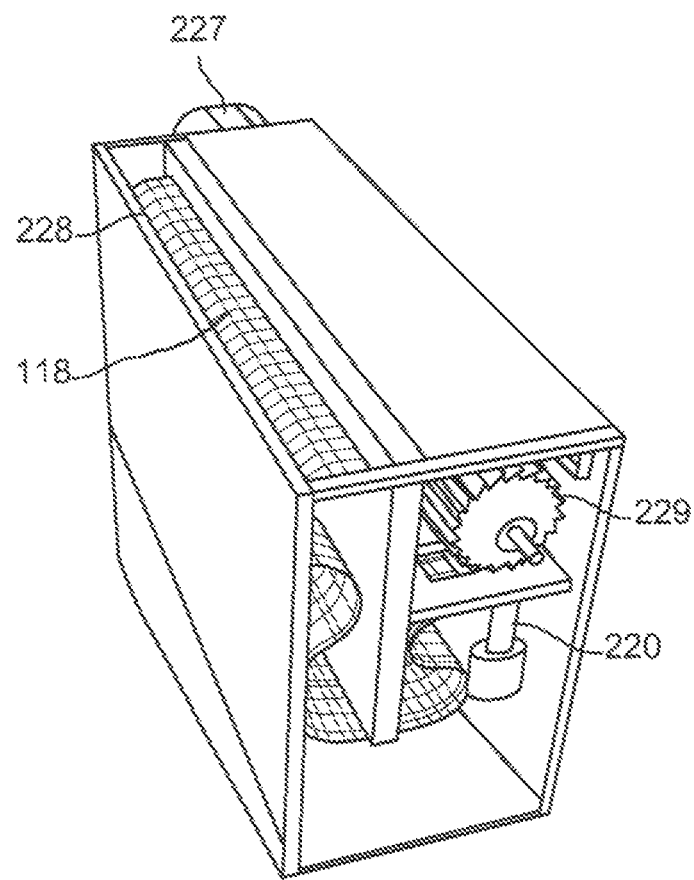
FIG. 7 exemplarily illustrates an open view of a condensation chamber according to an embodiment of the present invention.
Figure 8:
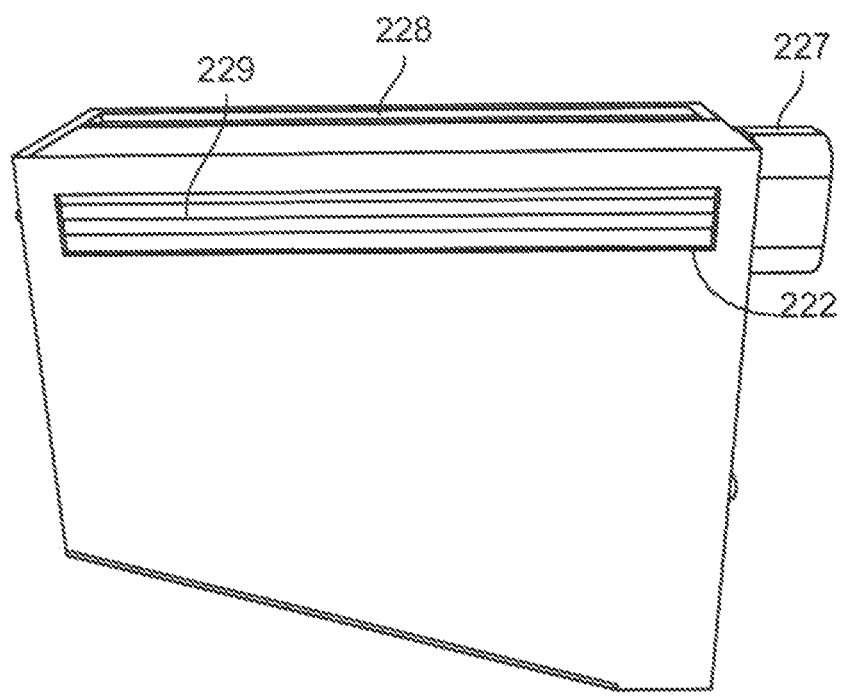
FIG. 8 exemplarily illustrates a front perspective view of the condensation chamber according to an embodiment of the present invention.

FIG. 7 exemplarily illustrates an open view of the collecting chamber 116 according to an embodiment of the present invention. FIG. 8 exemplarily illustrates a front perspective view of the collecting chamber 116 according to an embodiment of the present invention. The collecting chamber 116 comprises an incoming air flow slit 228, air flow vent 222, motor 227 driving the fan blade 229, water level sensor 220 and polymer plastic grid 118 enhanced with nanofibers 119. The air flow slit 228. The air flow slit 228 is configured to configured to function as an air inlet and the air flow vent 222 is configured to function as an air outlet.

Referring to FIG. 9, the method 900 of air purification using an air purifier apparatus 100 as shown in FIG. 1, FIG. 3, FIG. 4, FIG. 5 and FIG. 6 is also disclosed. At step 202, the method 900 comprises steps of, generation of micro droplets of water inside a mist generating chamber 102 incorporated with one or more ultrasound piezo electric vibrators 103 and driving the generated micro droplets into a connecting pipe 108 as well as outside the apparatus through nozzles 112 by a force of centrifuge fan 104. At step 204, the method 900 includes charging water micro droplets via charge transfer inside a charging chamber 109 through an applied voltage generated by a high voltage power supply 110 over the surface of series of electrodes 111 and discharging in a space between the electrodes 111 and on flow trajectory of water micro droplets. At step 204, the charged droplets also keep going on their pathway and finally get out of the apparatus 100 through a series of nozzles 112.

At step 206, the method 900 further comprises, Interaction of the charged micro droplets of water with air pollutants outside the apparatus. The step 206 takes place in a space between nozzles 112 and an air inlet 114. The step 206 acts as physical barrier for polluted air to come from the rear side of apparatus into the front side and polluted air is forcedly directed to the air inlet 114 of the apparatus 100. At step 204, the method 900 comprises, Reentering a mixture of interacted charged micro droplets and polluted air inside a collecting chamber of the apparatus 100 through pulling force of fan 115, gravity force exerted over the micro droplets and mild electrophoretic field force proceed by auxiliary electrodes 113. The main function of this step is to convert the mixture of interacted micro droplets into a contaminated liquid form and forwarding a fresh air outside the apparatus. The function of step 208 of method of 900 is achieved by collisions of the interacted micro droplets with surface modified nano fibers 119 on a plastic grid 118 and their intense tendency to adsorb on the surface of modified nano fibers 119. The fine aggregates of water droplets gradually accumulate together and form liquid contaminated water at the bottom of collecting chamber. Generated fresh air also forward to the outside the apparatus 100 through an air outlet 120. Finally, at step 210, the method 900 includes, transfer of contaminated water from collecting chamber 116 to a series of water treatment filters 122 via a water pump 121 and preparing clean water usable in step 202.

The air purification method 900 based on the functional step 208 of collecting charged micro droplets on a surface of plastic grid 118 enhanced with surface modified nano fibers 119 is a low energy consumption method comparing other air purification methods. The surface modified nanofibers 119 promote the collecting efficiency and eliminate the application of expensive condensers. The method 900 is also based on a continuous regeneration of the reactive charged micro droplets of water to interact with air pollutants that is more efficient comparing the air filtration method based on HEPA filters because they lose their efficiency during the working period while the droplet surface is fresh all the time.

The present invention provides enhanced purification efficiency. Enhanced active surface area of charged micro droplets of water of the present invention, comparing to that of fibers of commercially available air purifiers filters, results in high magnitude of interactions between air pollutants and treating factor (here micro droplets). Thus, according to the present invention, faster purification of specific amount of air will be done with this method and a smaller air purifier may be able to purify larger area.

The present invention provides an air purification method based on water treatment, which minimizes related parts and continuously refresh the treating factor. Common air purifiers utilize filter as active elements of air purification, but in the present invention charged micro droplets of water are active elements. While continuous generation of charged micro droplets is flowing in the apparatus, incoming air also continuously interacts with fresh active element and maximum treatment takes place. But in commercially available air purifiers, filters such as HEPA filters suffer from aging and saturation that reduce purification efficiency over time. Although the present invention uses filters to recycle water in the apparatus, the major treating factors are the charged micro droplets and water filters are secondary filters.

Further, some kind of commercially available air purifies for home application have extra options such as air humidifier, which generates water mist to elevate water content of air. Because the generated mist is freely moving in surrounding environment, these types of purifiers not only has zero effect on removal efficiency of these systems but also may cause easier transport of air pollutants such as particulate matters to human body. In contrast, in the present invention, the mist is reinterred to the apparatus after interaction with air pollutants and only fresh air (Initial air with decreased amount of pollutants) is released in surrounding environment.

Further, the present invention utilizes a very simple method for condensation of micro-droplets of water. The method is based on passing the micro droplets through a polymer plastic grid enhanced with nanofibers. The nanofibers act as trapping agent for micro droplets. Further, there is no need to design, fabricate, and produce any new type of filters for treatment of effluent water after air purification. All the required filters are accessible through conventional water treatment filters which includes sediment filters, particulate filters and carbon filters. These cost-effective filters remove the need of some costly air filters.

While the invention utilizes microcontroller and different type of sensors, the present invention could be used for treatment of different air pollutants based on programmable methods. For example, by changing the polarity of charged microdroplets the affinity to interact with polar pollutants changes. By sensing polar pollutants such as NOx, SO2 and etc., the microcontroller decides sufficient voltage between the poles of electrodes as well as collecting electrodes. The present invention could also be used in different application and designs. For example, the invention could be used as a portable air purifier as well as a window. The method could also be applied for detoxification of exhaust streams in industries such as gas and fuel burners.

The present invention is based on nature-inspired processes with no chemical reagents (such as Ozone) or harmful process (such as UV irradiation). For the process of the present invention, Applicants were inspired from the natural processes, such as raining and lightening, in which charged micro droplets of water (mist) remove harmful materials from air. The process of the present invention comprises compression and liquidizing the mist by nano fibers provide an opportunity to trap micro particles and accumulate them on their surface. Another advantage of the present invention is the continues production of active reagent (mist) that is critical in air purification, while other methods utilizes HEPA filters that suffer from aging and saturation over time. The present invention purifies air with common water treatment technologies that minimizes the need of new accessories and devices.

According to the present invention, the charged micro droplet particles are able to adsorb toxic gases and dissolve them in their body beside the treatment of particulate matters. In general, the treatment process in are invention is based on the transfer of air pollutants into a liquid phase of charged micro droplets while commercial air purifiers transfer the pollutants on the solid phase. While the active surface of the charged micro droplets is several hundred larger than fibers of HEPA filters, air purification will be done faster and more efficient.

The present invention is designed for removal of air pollutants such as particulate matters, toxic gaseous, volatile organic compound (VOC), biological pollutants and any external material that directly or indirectly affects human health. The apparatus could be used as indoor and outdoor application. The apparatus could also be used as a home appliance or either may be used in offices, laboratories, industries and etc.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions.

Although specific terms may be employed herein, they are used only in generic and descriptive sense and not for purposes of limitation. Accordingly, the present invention is not limited to the specific embodiments illustrated herein. While the above is a complete description of the preferred embodiments of the invention, various alternatives, modifications, and equivalents may be used. Therefore, the above description and the examples should not be taken as limiting the scope of the invention, which is defined by the appended claims.

The invention claimed is:

1. An air purification apparatus, comprising:

a mist generator, configured to convert a supply of water to microdroplets of water by means of ultrasonic waves, produced by a piezo electric ceramic vibrator with a vibration frequency in the range of 1 kilo Hertz to 10 mega Hertz, and a water level sensor incorporated in a chamber with at least one water inlet and a fan configured to produce and forward the microdroplets of water toward a connecting pipe;

the connecting pipe configured to forward the microdroplets of water from the mist generator toward a charging chamber by means of the fan;

a charging chamber, in fluid communication with the mist generator, comprises a high voltage power supply, a series of paired electrodes and a pair of auxiliary electrodes, the charging chamber is configured to apply electrical polarity to the microdroplets of water passing between the series of paired electrodes and the pair of auxiliary electrodes to generate charged microdroplets of water and force the charged microdroplets of water to a space outside the apparatus, that requires air purification, through a plurality of nozzles;

the fan configured to pull a mixture of air containing pollutants and the charged microdroplets of water and transfer pollutants from the mixture of air to the charged microdroplets of water;

a collection chamber having a plurality of plastic grids enhanced with surface modified nanofibers configured to receive the mixture of air, wherein the plurality of plastic grids are configured to convert the charged microdroplets of water into a polluted water and separates fresh air from the charged microdroplets of the polluted water for emission into a surrounding environment, and a set of water treatment devices configured to recycle the polluted water to clean water usable in the mist generator.

2. The apparatus of claim 1, further comprises at least a further pair of auxiliary electrodes placed outside the charging chamber and in the trajectory of the connecting pipe and the collection chamber to assist in collecting the charged microdroplets after interaction with air pollutants by means of Coulomb forces, hydrogen bond forces, and physical absorption on the surface of droplets and forms an interacted form of charged micro droplets.

3. The apparatus of claim 1, wherein the collection chamber comprises a fresh water inlet and an outlet, with the fan and the high voltage power supply, the fresh water inlet to compensate water loss of system, and the outlet is configured to emit the fresh air into the surrounding environment.

4. The apparatus of claim 1, further comprises the high voltage power supply to provide electrical energy to the apparatus and a microprocessor to control operation of the apparatus.

5. The apparatus of claim 1, wherein the mist generator comprises the piezo electric ceramic vibrator and the water level sensor incorporated in the chamber with at least one water inlet and the fan configured to produce and forward the microdroplets of water toward the connecting pipe.

6. The apparatus of claim 1, wherein the charging chamber comprises the high voltage power supply, the series of paired electrodes and the pair of auxiliary electrodes.

7. The apparatus of claim 1, wherein the series of paired electrodes and the pair of auxiliary electrodes are configured as a flat sheet, disk or needle shape.

8. The apparatus of claim 1, wherein the surface modified nanofibers are electrospun nanofibers selected from a group comprising solvent born fibers and polyacrylonitrile (PAN).

* * * * *